(12) United States Patent
Kim

(10) Patent No.: US 10,254,522 B2
(45) Date of Patent: Apr. 9, 2019

(54) ULTRA-SHORT THROW PROJECTOR

(71) Applicant: PRAZEN CO., LTD., Kyunggi-do OT (KR)

(72) Inventor: Heekyung Kim, Gyeonggi-do (KR)

(73) Assignee: PRAZEN CO., LTD., Kyunggi-do (KR)

( * ) Notice: Subject to any disclaimer, the term of this patent is extended or adjusted under 35 U.S.C. 154(b) by 0 days.

(21) Appl. No.: 15/792,374

(22) Filed: Oct. 24, 2017

(65) Prior Publication Data

US 2018/0210181 A1    Jul. 26, 2018

(30) Foreign Application Priority Data

Jan. 26, 2017  (KR) .................. 10-2017-0012924
Jul. 11, 2017  (KR) .................. 10-2017-0087872

(51) Int. Cl.
*G02B 17/08*    (2006.01)
*G03B 21/28*    (2006.01)
*G02B 19/00*    (2006.01)

(52) U.S. Cl.
CPC ......... *G02B 17/08* (2013.01); *G02B 19/0028* (2013.01); *G02B 19/0047* (2013.01); *G03B 21/28* (2013.01)

(58) Field of Classification Search
CPC .............. G02B 17/08; G02B 19/0028; G02B 19/0047; G03B 21/28
USPC ............................................. 359/708
See application file for complete search history.

(56) References Cited

U.S. PATENT DOCUMENTS

| | | | |
|---|---|---|---|
| 5,914,818 A * | 6/1999 | Tejada | G02B 13/02 359/663 |
| 6,208,470 B1 * | 3/2001 | Anderson | H04N 9/3185 348/E9.027 |
| 2008/0297726 A1 * | 12/2008 | Rodriguez, Jr. | G03B 21/14 353/13 |
| 2010/0079733 A1 * | 4/2010 | Lu | G02B 13/06 353/69 |

* cited by examiner

*Primary Examiner* — James Greece
(74) *Attorney, Agent, or Firm* — IP & T Group LLP

(57) ABSTRACT

An ultra-short throw projector device includes a lens system. The lens system includes a first lens group configured to form a first intermediate image from an incident display image; a second lens group configured to form a second intermediate image from the first intermediate image; an aperture configured to be disposed on a point where the first intermediate image is formed between the first lens group and the second lens group; a reflection mirror configured to reflect and magnify the second intermediate image and form an image on a screen; and a light path changing prism configured to change a light path in the vertical direction or other directions, the prism being disposed at a point on the light path of the lens system, at least one of an incident surface and a refracting surface being an aspherical surface or a freeform surface.

19 Claims, 15 Drawing Sheets

ULTRA-SHORT THROW PROJECTOR

CROSS-REFERENCE TO RELATED APPLICATIONS

The present application claims priority under 35 U.S.C. § 119(a) to Korean Patent Applications No. 10-2017-0012924 and 10-2017-0087872, filed on Jan. 26, 2017 and Jul. 11, 2017 respectively, which are incorporated herein by reference in its entirety.

Technical Field

The present invention relates to an ultra-short throw projector, more specifically, to an ultra-short throw projector having an lens system of the ultra-short throw projector, wherein a prism is used on an optical path to change the optical path whereby the projector device is miniature, and incident surface and/or refracting surface is processed as an aspheric surface and/or freeform surface so that the number of lens in the lens system is reduced or aspheric process of some lens is omitted, whereby weight of the total system is lightened and cost is saved.

Background Art

A beam projector device (referred as a projector, hereinafter) is used to project and enlarge images optically. A projector in the art is used by making it apart from a screen in a sufficient distance in order to project and enlarge the image on the screen. Due to such a comparatively long distance, there may be an obstacle in a projection path between the projector and the screen in the art, and accordingly there occurs a case frequently that watching image is not preformed smoothly. Especially, when the projector in the art is used in a small space, it is not easy to embody a large screen display due to the limit of the projection distance.

Further, while using the projector in a certain place, when a separate screen is not prepared or there is not prepared wall or ceil as a screen, it may not possible to visualize the image.

In order to solve such a problem, an ultra-short throw projector device has been studied and developed. The ultra-short throw projector device has a very short distance between the projector and the screen so that it may be easily used in a small place, and obstacles on the optical path may be fundamentally prevented which may exist as the projection distance becomes long. Additionally, the ultra-short throw projector device may project the image on a plane on which the projector is placed, so that there is an advantage that a table for conference, a desk and so on may be used as a screen.

Further, since a reflection mirror used in the ultra-short throw projector device is an aspheric mirror having a curvature shape, it may be possible to curve the light projected from the projection unit and make the angle of the projected light wide, simultaneously. That is, it may be possible to focus the image and perform an enlarging function of the image, simultaneously.

FIG. 1 shows a lens system of an ultra-short focus projector in the art, illustrating a configuration of a projection lens and its image formation theory.

Referring to FIG. 1, an image appearing on an image component 200 passes through a prism 209 and a first lens group 201 and refracts, so that a first intermediate image 203 is formed near an aperture 206. The first lens group 201 includes a double convex lens, a convexo-concave lens, and a double concave lens. The first intermediate image 203 passes through the aperture 206 and the second lens group 202 and refracts, so that a second intermediate image is formed. The second lens group 202 includes a double convex lens, a convexo-concave lens, a double concave lens, and an aspheric lens.

The second intermediate image 204 is reflected on a reflection mirror 205, so that an image is formed on a screen (not shown).

FIG. 2 shows a status that an image reflected on a reflection mirror 205 according to a lens system of an ultra-short throw projector device in the art is formed on a screen.

SUMMARY OF THE INVENTION

An ultra-short throw projector device needs to be minimized in consideration of portability. Further, it has to be miniaturized when being connected to or embedded in other devices such as a virtual reality display device, an augmented reality display device, a GPS display device, a scanner and a printer, in the future.

However, as mentioned above, since a lens system of the ultra-short throw projector device in the art has a plurality of lens arranged linearly, the entire projector device increases in length in one direction so that the device size increased entirely. Further, the lens system of the ultra-short throw projector device has a plurality of lens, some being aspherically processed, so it is disadvantageous to employ such the lens system in view of lightening and cost saving.

Accordingly, it is an objective of the ultra-short throw projector device according to the present invention to change a light path using a prism in the light path of the lens system, reducing one direction length of the lens system, so that the entire projector device is miniaturized.

Further, it is another objective of the ultra-short throw projector device according to the present invention to process the incident surface and/or refracting surface of the prism as an aspherical surface and/or a freeform surface so as to substitute for some aspherical lens of the lens system, thereby reducing the number of the total lens, or to omit aspherical process of some lens, so that it may be embodied to lighten the projector device entirely and save the cost.

In accordance with an aspect of the present invention, there is provided an ultra-short throw projector device having a lens system, wherein the lens system includes a first lens group configured to form a first intermediate image from an incident display image; a second lens group configured to form a second intermediate image from the first intermediate image, the second lens group being disposed in the back of the first intermediate lens group; an aperture configured to be disposed on a point where the first intermediate image is formed between the first lens group and the second lens group; a reflection mirror configured to reflect and magnify the second intermediate image and form an image on a screen, the reflection mirror being disposed in the back of the second lens group; and a light path changing prism configured to change a light path in the vertical direction or other directions, the prism being disposed at a point on the light path of the lens system, at least one of an incident surface and a refracting surface being an aspherical surface or a freeform surface, wherein the throw ratio of the lens system is 0.05 to 0.3, and the EFL (Effective Focal Length) is 0.1 mm to 0.8 mm.

Preferably, the prism may be disposed between the aperture and the second lens group, in the lens system.

Preferably, the reflection mirror may be configured of a plurality of mirrors, each mirror being an aspheric mirror or a freeform surface mirror.

Preferably, the reflection mirror may be configured of a plurality of mirrors, each mirror being a convex mirror or a concave mirror.

Preferably, at least one of the first lens group and the second lens group may include one or more both-side aspheric lens.

Preferably, the ultra-short throw projector device according to the present invention may further include a transparent window which is disposed between the reflection mirror and the screen, the window being attached to an outer surface of the projector device.

Preferably, the window may be configured of a lens, and at least one surface of the window may be an aspheric lens.

Preferably, the ultra-short throw projector device according to the present invention may further include a LED or a laser as a light source.

Preferably, the ultra-short throw projector device according to the present invention may further include a DMD (Digital Micro-mirror Display) panel, a LCD panel or an LCOS (Liquid Crystal On Silicon) panel as a display.

Preferably, the ultra-short throw projector device according to the present invention may further include a micro-LED as a light source.

Preferably, the lens system may be employed in a voice assistant speaker based on AI.

Preferably, the lens system may be employed in a smart ordering device.

Preferably, the lens system may be employed in a transparent signage system.

Preferably, the lens system may be employed in a smart home controller.

Preferably, the longer side of the lens system whose light path is changed may be 5 cm or less in length.

Preferably, the lens system may be employed in a head mounted display device of an augmented reality display or a virtual reality display, generating an augmented image or a virtual image.

Preferably, the lens system may be employed in a scanner or a printer, generating a scanning image or a printing image.

In accordance with another aspect of the present invention, there is provided an ultra-short throw projector device having a lens system, wherein the lens system includes a first lens group configured to form a first intermediate image from an incident display image; a second lens group configured to form a second intermediate image from the first intermediate image, the second lens group being disposed in the back of the first intermediate lens group; an aperture configured to be disposed on a point where the first intermediate image is formed between the first lens group and the second lens group; a reflection mirror configured to reflect and magnify the second intermediate image and form an image on a screen, the reflection mirror being disposed in the back of the second lens group; and a light path changing prism configured to change a light path in the vertical direction or other directions, the prism being disposed at a point on the light path of the lens system, wherein the throw ratio of the lens system is 0.05 to 0.3, and the EFL (Effective Focal Length) is 0.1 mm to 0.8 mm.

According to the present invention, by using a prism on a light path in a lens system of an ultra-short throw projector device, a light path is changed so that ultra-short throw projector device may be miniaturized. That is, an incident surface and/or a refracting surface of the path changing prism is processed as an aspheric and/or a freeform surface, and as a convex lens and/or a concave lens, so that the lens number of the lens system is reduced or an aspheric process of some lens, thereby embodying lightening of the entire system and cost saving. Further, by processing an inner or outer surface of a window of the projector device as an aspheric surface or the like, the lens number of the lens system is reduced or the lens process is omitted, so that it may be embodied to lighten the entire system and save costs.

BEST MODE

Hereinafter, an ultra-short throw projector device in accordance with the present invention will be described in detail with reference to attached drawings.

Figure 3:
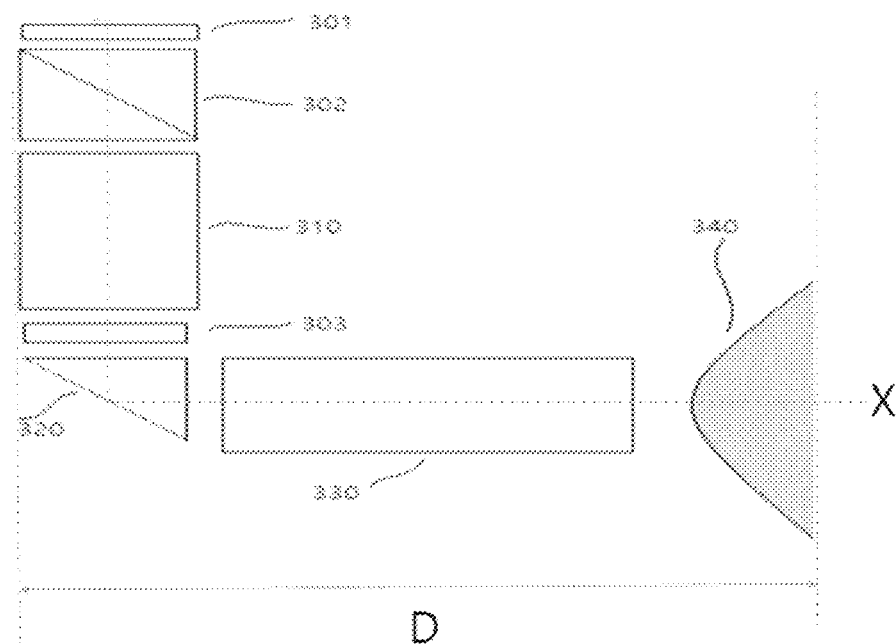
FIG. 3 is a block diagram of a lens system of an ultra-short throw projector device in accordance with an embodiment of the present invention.

FIG. 3 is a block diagram of a lens system of an ultra-short throw projector device in accordance with an embodiment of the present invention.

Referring to FIG. 3, a lens system of the ultra-short throw projector device in accordance with the embodiment of the present invention includes an image component 301, a TIR (Total Internal Reflection) prism 302, a first lens group 310, an aperture 303, a light path change prism 320, a second lens group 330 and a reflection mirror 340, on a single light path.

The image component 301 may be one of a DMD (Digital Micromirror Display) panel, a LCD panel and a LCOS (Liquid Crystal On Silicon) panel.

The first lens group 310 and the second lens group 330 are used to form a first intermediate image and a second intermediate image, and each lens group may include two of both-side aspheric lens. The first intermediate image may be formed on a point of the aperture 303 in the back of the first lens group 310. The second intermediate image may be formed on a certain point in the back of the second lens group 330.

The aperture 303 may be disposed between the first lens group 310 and the second lens group 330, enhancing the image resolution and controlling the depth of field, thereby improving the image formation quality. Further, it may be used to control the scope of an image formation space and the brightness of an image. The aperture 303 may be disposed on a point of the first intermediate image, so that the image formation quality of off-axis points may be improved. Accordingly, a reflection flare component may be removed, so that an image contrast may be enhanced.

The reflection mirror 340 of the present invention is disposed in the back of the second lens group, that is, it is disposed at an image formation point of the second intermediate image or behind that, reflecting and magnifying the second intermediate image. The reflection mirror 340 may be a single mirror or a plurality of mirrors. In the present embodiment, a single flection mirror 340 is employed. Each reflection mirror may have a shape whose reflection surface is aspherical or freeform. Further, the reflection mirror 340 may have a shape whose reflection surface is convex or concave. Meanwhile, when the reflection mirror 340 is configured of a plurality of mirrors, each mirror may have a shape whose reflection surface is aspherical or freeform, and/or whose reflection surface is convex or concave, like the single mirror.

Referring to FIG. 3, the light path change prism of the lens system of the ultra-short throw projector device in accordance with the present invention may be single or plural in number. In the present embodiment, a single light path change prism is employed. In case of the single light path change prism, the light path may be changed by 90°. In case that the light path change prism is plural in number, the light path may be changed by 180° or more.

Figure 1:
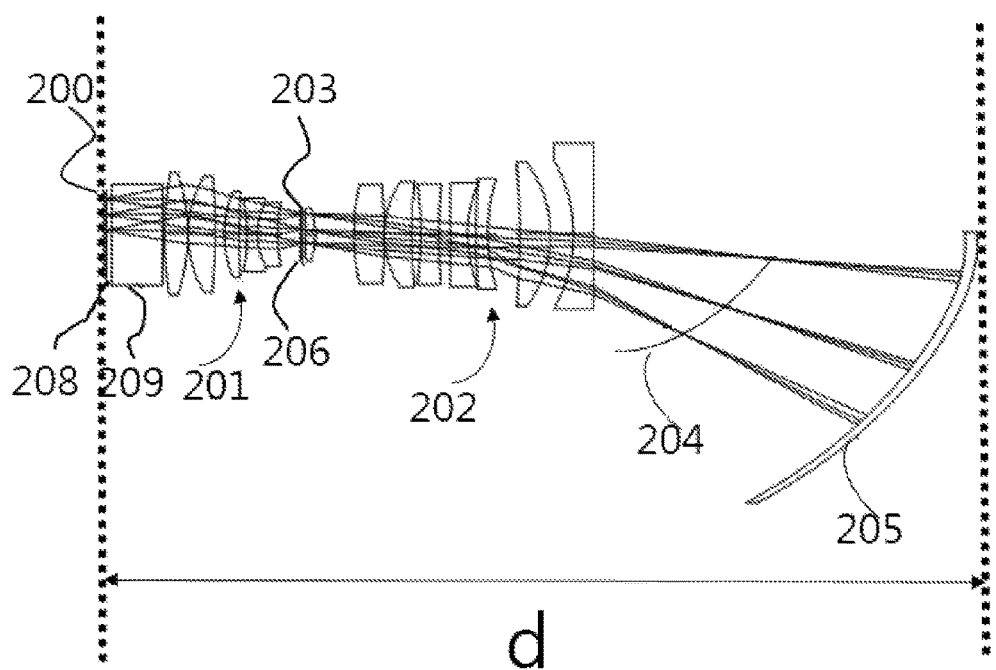
FIG. 1 shows a lens system of an ultra-short focus projector device in the art, illustrating a configuration of a projection lens and its image formation theory.
Figure 2:
FIG. 2 shows a status that an image reflected on a reflection mirror according to a lens system of an ultra-short throw projector device illustrated in FIG. 1 is formed on a screen.

As such, a one direction length of the lens system of the ultra-short throw projector device of the present invention may be reduced by changing the light path using the prism. That is, compared with the light path length d of the lens system in the art illustrated in FIG. 1, the one direction light path length D of the lens system of the present invention may be reduced by moving the image device 301, the TIR prism 302, the first group lens 310, and the aperture 303 by 90° with respect to a main light axis X. Of course, the one direction length D may additionally include the length of the light path change prism.

By reducing the light path length of the lens system, the total size of the ultra-short throw projector device may be reduced, so that it may be advantageous when the ultra-short throw projector device of the present invention is combined with other devices such as a virtual reality display device, an augmented reality display device, a GPS display device, a scanner and a printer. That is, a small size ultra-short throw projector device of the present invention may be connected to or embedded in the other devices, so that the entire system design may be more freely performed.

Figure 4A:
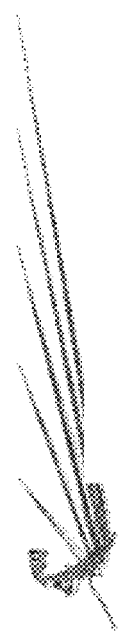
FIGS. 4a and 4b are views illustrating that an image is magnified and formed on a screen in an ultra-short throw projector device in accordance with the present invention illustrated in FIG. 3.
Figure 4B:
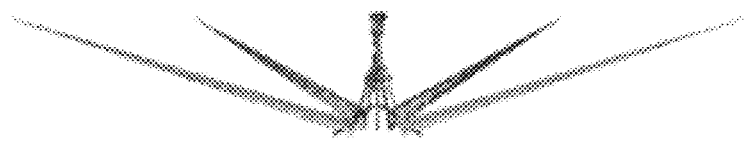

FIGS. 4a and 4b are views illustrating that an image is magnified and formed on a screen in an ultra-short throw projector device in accordance with the present invention illustrated in FIG. 3.

Referring to FIG. 4a, it is noted that an image reflected on an aspherical reflection mirror is vertically diffused with a curvature of a mirror which is designed previously and displayed on a screen. Further, FIG. 4b shows a shape illustrating that the ultra-short throw projector device in accordance with the present invention is viewed from the upper side, where an image is horizontally diffused with a curvature of a mirror designed previously and displayed on a screen.

As such, by employing a lens system including a prism in accordance with the present invention, it is noted that the length of the lens system is remarkably reduced in one direction and accordingly the total size of the ultra-short throw projector device is reduced. According to an embodiment, it may be possible that the total length of the lens system in the ultra-short throw projector device is reduced by about 45 percent in the one length direction, compared to the lens system in the art, thereby realizing the miniaturization of the ultra-short throw projector device.

FIGS. 5a to 5d show various embodiments of prisms used in the ultra-short throw projector device in accordance with the present invention.

A light path change prism of the lens system in accordance with the present invention may be configured by processing its incident surface and refracting surface as an aspherical/freeform lens, and/or a convex/concave lens.

Figure 5A:
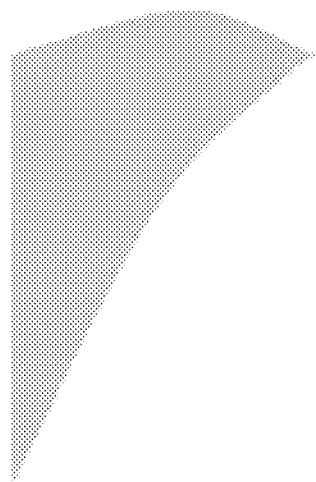
FIGS. 5a to 5d show various embodiments of the prism used in an ultra-short throw projector device in accordance with the present invention.

FIG. 5a shows an embodiment where one surface of the light path change prism is an aspherical surface and the other surface is a concave surface. As such, by processing a light incident surface and a light refracting surface of the prism, one or more lens in the first and second lens groups illustrated in FIG. 3, for example, an aspherical lens may be substituted with the prism, or its lens processing may be substituted with the prism.

Figure 5B:
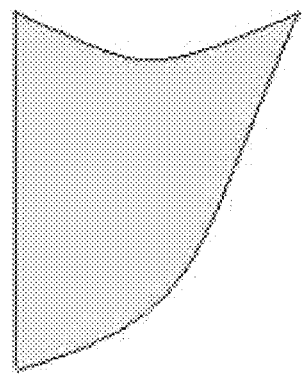

FIG. 5b shows an embodiment where one surface of the light path change prism is a freeform surface and the other surface is an aspheric surface. As such, by processing a light incident surface and a light refracting surface of the prism, one or more lens in the first and second lens groups illustrated in FIG. 3, for example, an aspheric lens may be substituted with the prism, or its lens processing may be substituted with the prism.

Figure 5C:
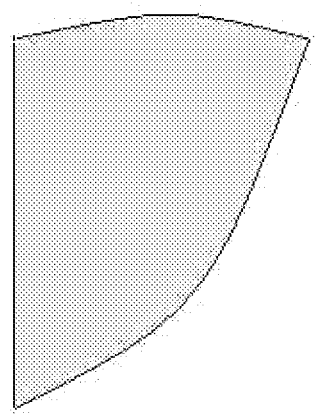

FIG. 5c shows an embodiment where one surface of the light path change prism is a convex lens and the other surface is a freeform surface. As such, by processing a light incident surface and a refracting surface of the prism, one or more lens in the first and second lens groups illustrated in FIG. 3, for example, a convex lens may be substituted with the prism, or its lens processing may be substituted with the prism.

Figure 5D:
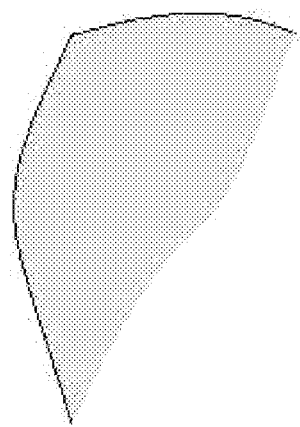

FIG. 5d shows an embodiment where both surfaces of the light path change prism are aspheric lens. As such, by processing a light incident surface and a refracting surface of the prism, one or more lens in the first and second lens groups illustrated in FIG. 3, for example, an aspherical lens may be substituted with the prism, or its lens processing may be substituted with the prism.

Figure 6:
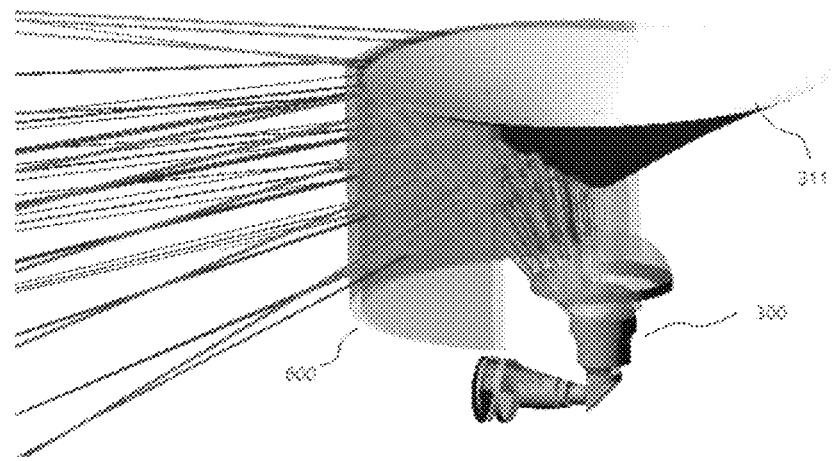
FIG. 6 shows a view that a window is mounted on an ultra-short throw projector device in accordance with the present invention.

FIG. 6 shows an embodiment in which a window is mounted on the ultra-short throw projector device in accordance with the present invention.

As illustrated in the FIG. 6, a window 600 may be disposed outside the reflection mirror 311 in the projector device, that is, disposed between the reflection mirror 311 and a screen (not shown). The window 600 is mounted on an external surface of the projector device so as to protect the lens system primarily. In other words, the window 600 may protect the lens system not to be contaminated from foreign dusts or materials, more specifically, protect the reflection mirror 311 from being contaminated.

In accordance with the present invention, the window 600 is fabricated with a lens material such as PMMA or the like, to be served as a lens by processing its internal and external surfaces. That is, by aspherically processing the window 600, it may be possible to substitute an aspherical lens in any one of the first lens group and the second lens group, or omit an aspherical processing of the lens. Accordingly, the configuration of the entire lens system may be simplified by processing the window, resulting in cost saving. Meanwhile, although the window of the present invention is employed, the entire size and weight of the ultra-short throw projector device is not increased.

Figure 7:
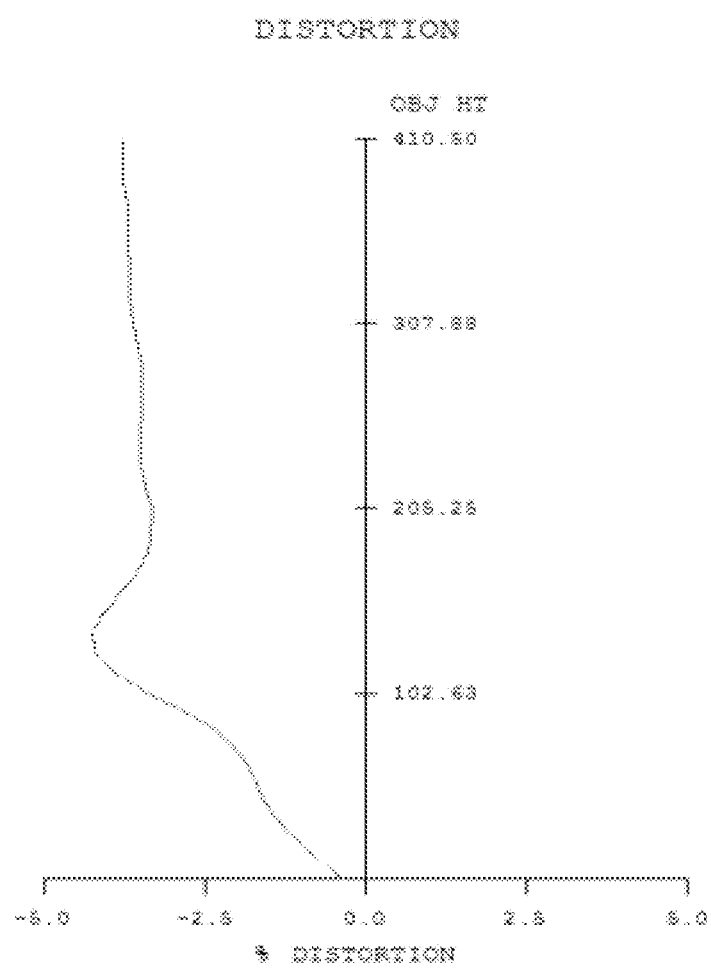
FIG. 7 shows a graph illustrating an image distortion in an ultra-short throw projector device in accordance with the present invention.

FIG. 7 shows a graph illustrating an image distortion in the ultra-short throw projector device in accordance with the present invention.

Referring to FIG. 7, it is indicated that the distortion ratio is within 5 percent or less in all screen area on which the image light is projected, which is very desirable.

Figure 8:
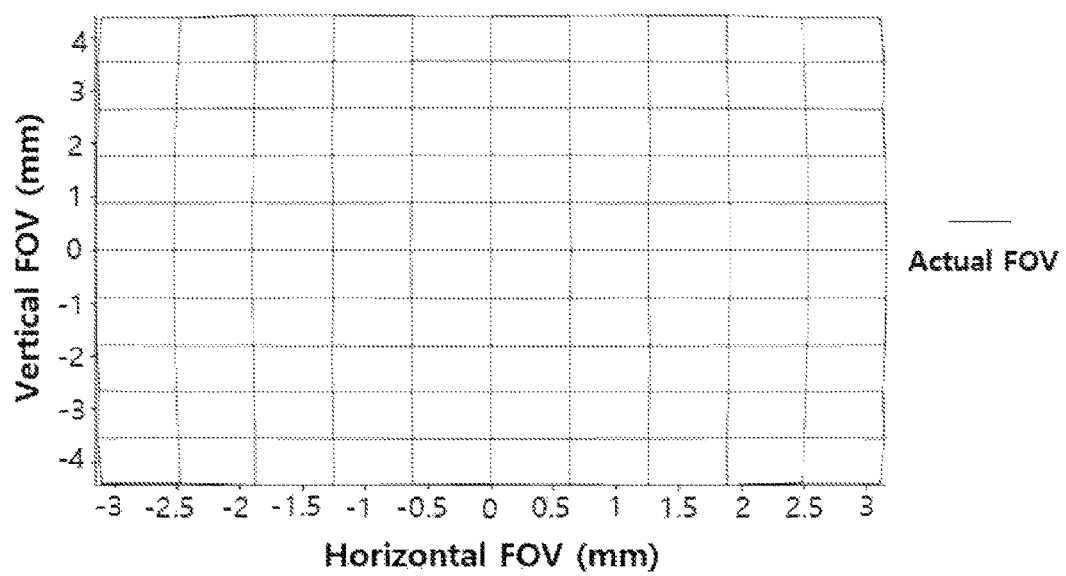
FIG. 8 shows a view illustrating a distortion grid characteristic of an ultra-short throw projector device in accordance with the present invention.

FIG. 8 shows a view illustrating a distortion grid characteristic of the ultra-short throw projector device in accordance with the present invention.

Referring to FIG. 8, it is indicated that the distortion grid of the image in the edge of the screen is within 5 percent or less.

Figure 9:
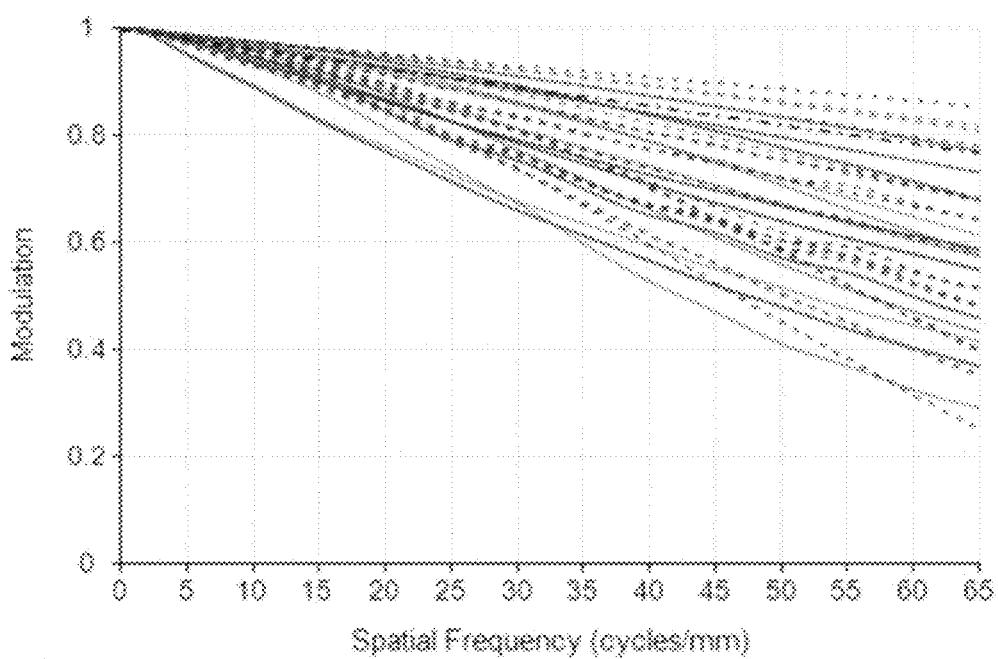
FIG. 9 shows a view illustrating an MTF in an image area of an ultra-short throw projector device in accordance with the present invention.
Figure 10A:
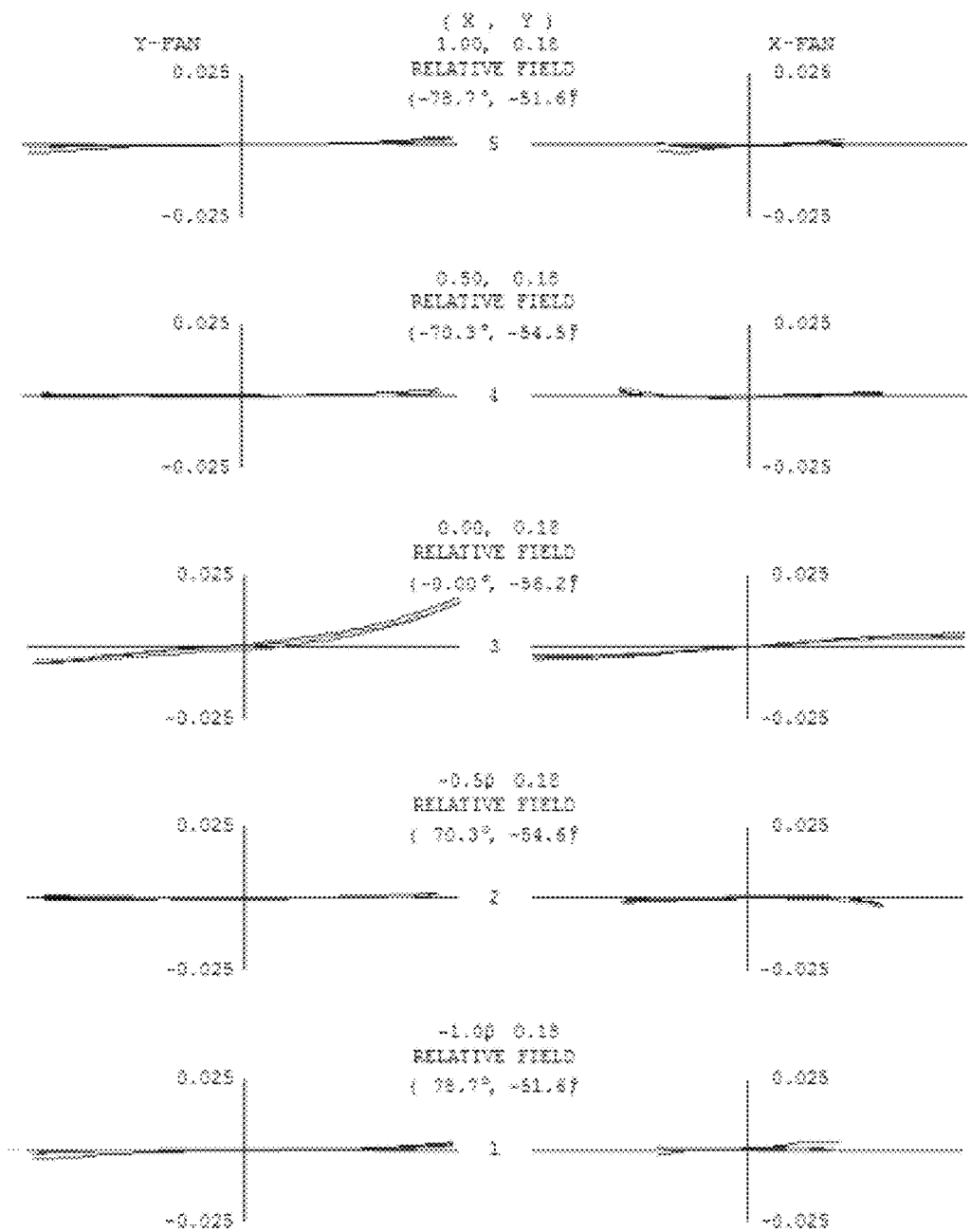
FIGS. 10a to 10e are aberration analysis graphs used to analyze aberrations in a lens system of an ultra-short throw projector device when using a prism of the present invention.
Figure 10B:
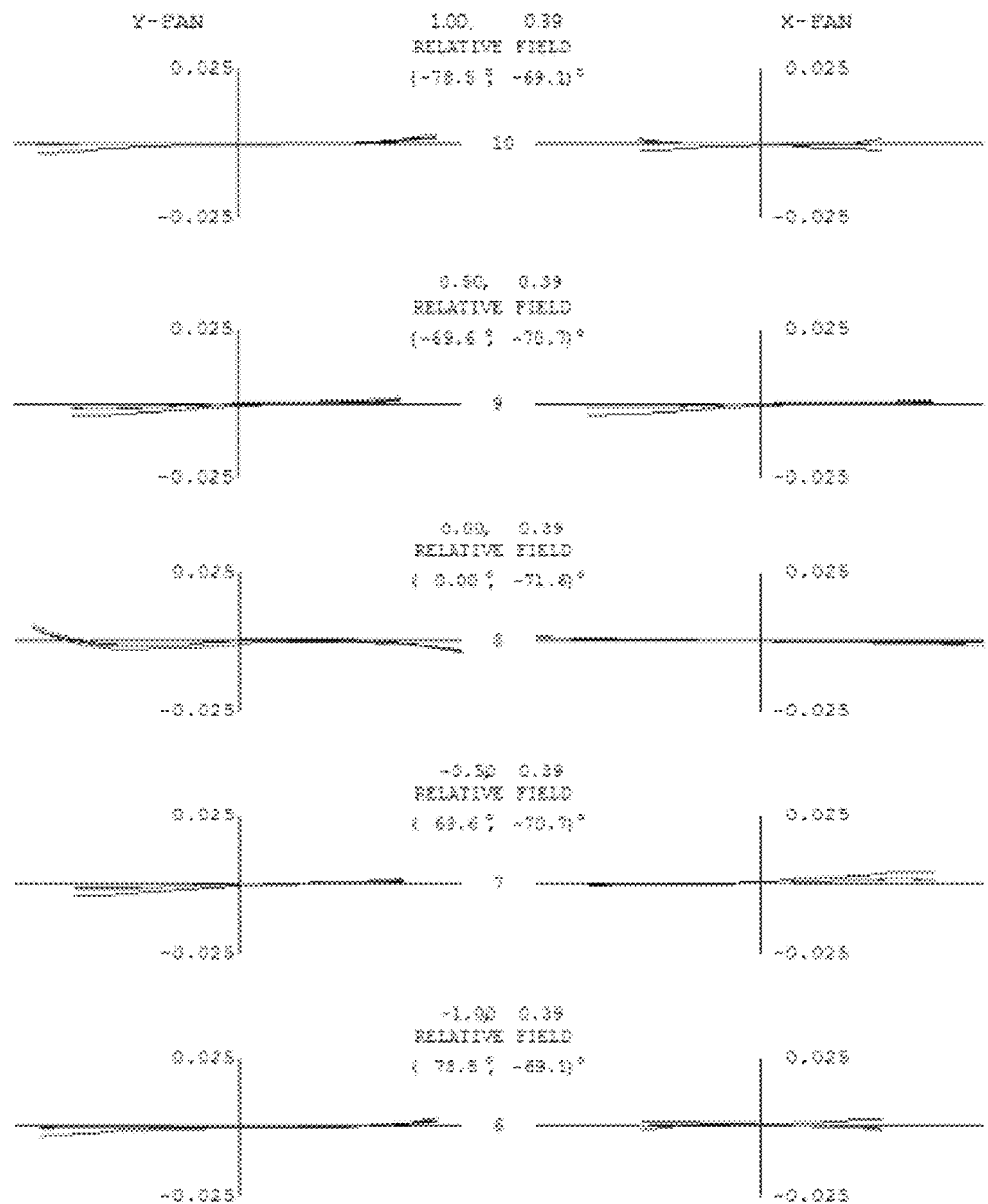
Figure 10C:
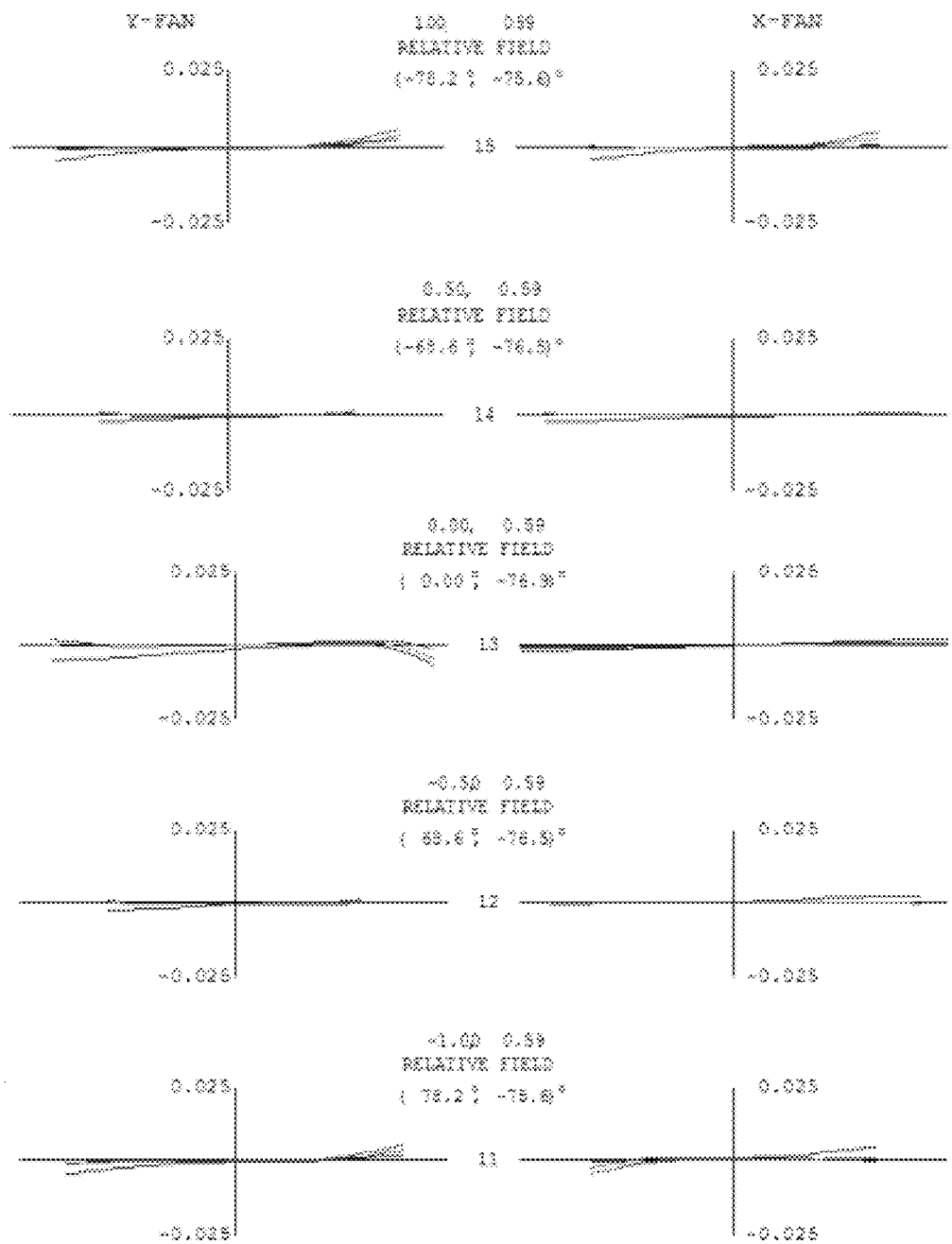
Figure 10D:
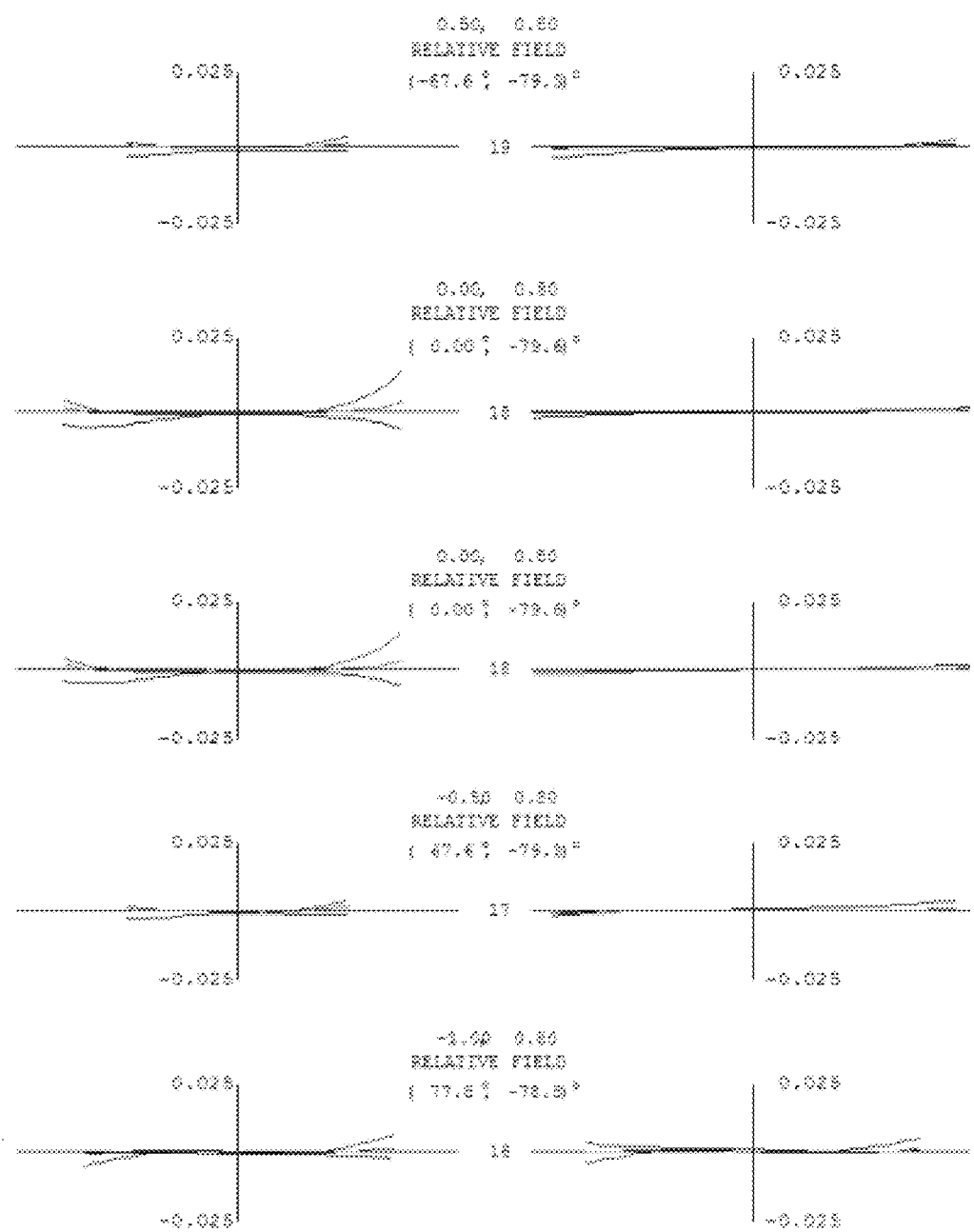
Figure 10E:
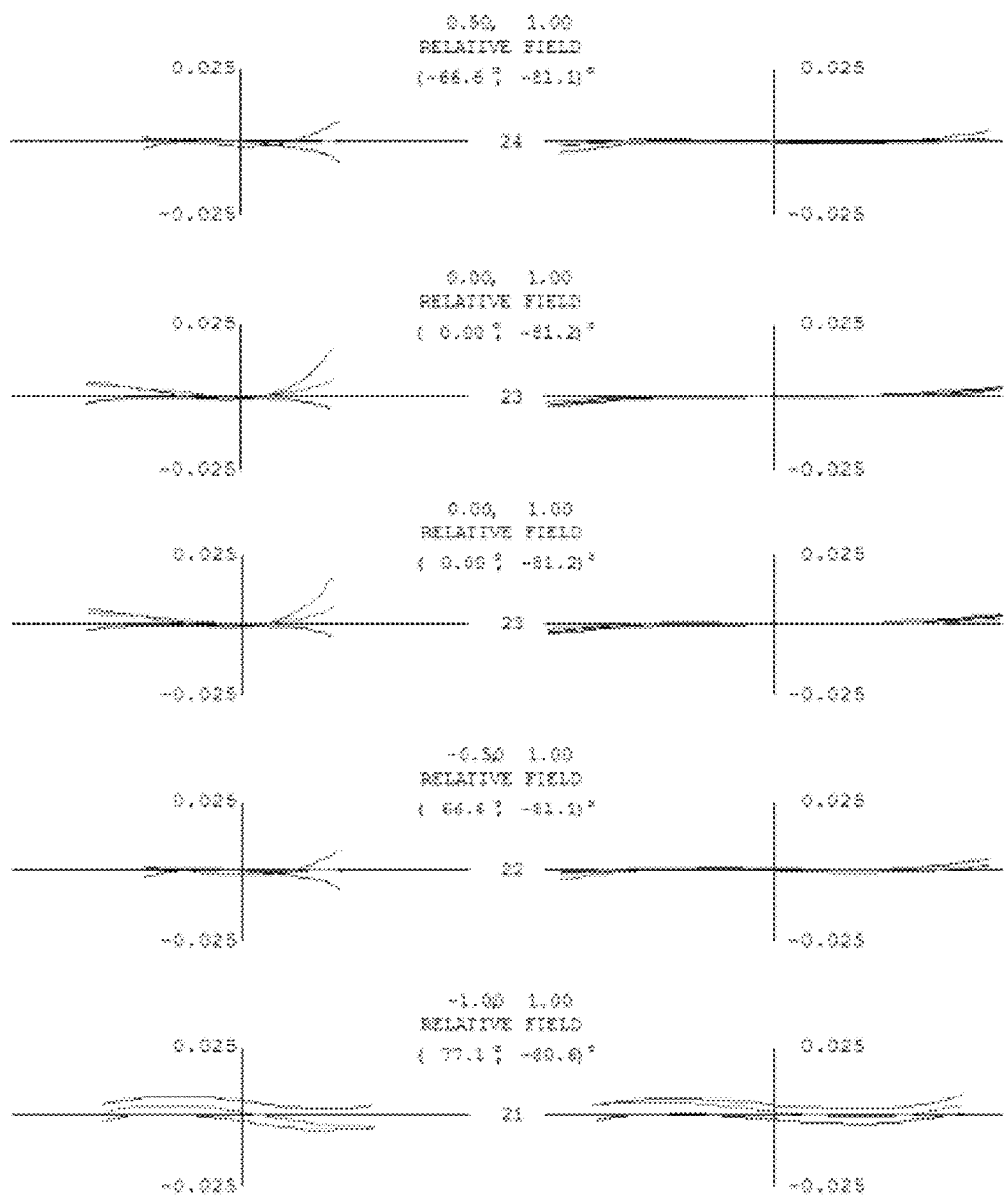

FIG. 9 shows a view illustrating an MTF in an image area of the ultra-short throw projector device in accordance with the present invention.

As shown in FIG. 9, although the lens system of the ultra-short throw projector device in accordance with the present invention employs an additional prism, a good MTF (Modulation Transfer Function) is realized, forming a clear image.

FIGS. 10a to 10e are aberration analysis graphs used to analyze aberrations in a lens system of the ultra-short throw projector device when using a prism of the present invention.

As shown in the figures, it is noted that each graph indicates a good aberration characteristic.

Figure 11:
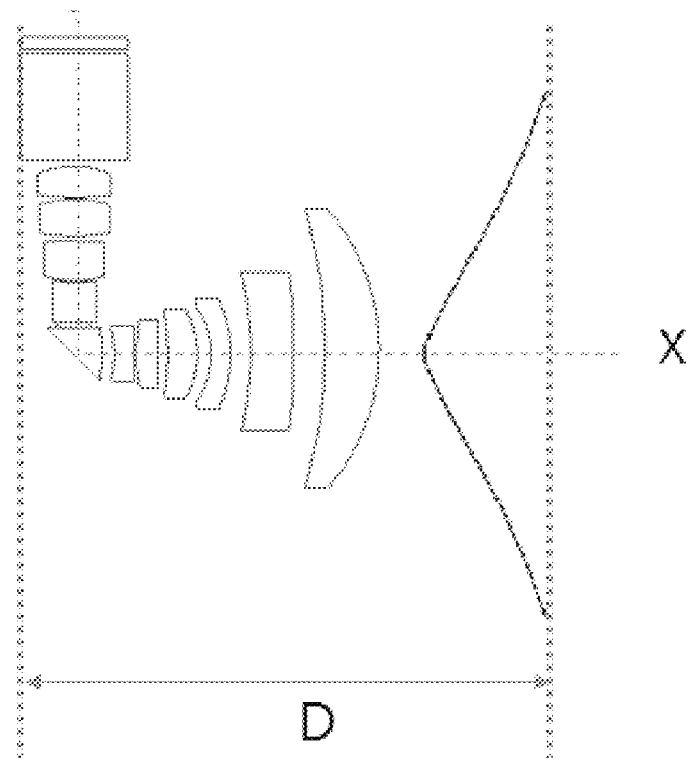
FIG. 11 is another embodiment of an ultra-short throw projector device according to the present invention.

FIG. 11 shows another embodiment of an ultra-short throw projector device according to the present invention.

Referring to FIG. 11, different from the ultra-short throw projector device illustrated in FIG. 3, it is noted that individual lens are substituted with lens blocks. Further, a light path change prism may be a spherical lens.

As to some applications of the present invention, the lens system may be employed in a voice assistant speaker based on AI or a smart ordering device.

Further, the lens system of the present invention may be employed in a transparent signage system or a smart home controller.

Furthermore, the lens system of the present may be employed in a head mounted display device of an augmented reality display or a virtual reality display, generating an augmented image or a virtual image.

Furthermore, the lens system of the present invention may be employed in a scanner or a printer, generating a scanning image or a printing image.

Although the present invention was illustrated and described with reference to preferred embodiments, it is not limited to a specific embodiment described above. The present invention may be changed and modified in various ways, without departing from the ideas and technical regions described in claims, by those skilled in the art. Accordingly, technical scope of the present invention is not restricted to the detailed description but should be defined by claims only.

The invention claimed is:

1. An ultra-short throw projector device having a lens system, wherein the lens system comprises:

a first lens group configured to form a first intermediate image from an incident display image;

a second lens group configured to form a second intermediate image from the first intermediate image, the second lens group being disposed in the back of the first intermediate lens group;

an aperture configured to be disposed on a point where the first intermediate image is formed between the first lens group and the second lens group;

a reflection mirror configured to reflect and magnify the second intermediate image and form an image on a screen, the reflection mirror being disposed in the back of the second lens group; and a light path changing prism configured to change a light path in the vertical direction or other directions, the prism being disposed at a point on the light path of the lens system, at least one of an incident surface and a refracting surface being an aspherical surface or a freeform surface, wherein the throw ratio of the lens system is 0.05 to 0.3, and the EFL (Effective Focal Length) is 0.1 mm to 0.8 mm.

2. The ultra-short throw projector device of claim 1, wherein the prism is disposed between the aperture and the second lens group, in the lens system.

3. The ultra-short throw projector device of claim 1, wherein the reflection mirror is configured of a plurality of mirrors, each mirror being an aspheric mirror or a freeform surface mirror.

4. The ultra-short throw projector device of claim 1, wherein the reflection mirror is configured of a plurality of mirrors, each mirror being a convex mirror or a concave mirror.

5. The ultra-short throw projector device of claim 1, wherein at least one of the first lens group and the second lens group includes one or more both-side aspheric lens.

6. The ultra-short throw projector device of claim 1, further comprising a transparent window which is disposed between the reflection mirror and the screen, the window being attached to an outer surface of the projector device.

7. The ultra-short throw projector device of claim 1, wherein the window is configured of a lens, and at least one surface of the window is an aspheric lens.

8. The ultra-short throw projector device of claim 1, further comprising a LED or a laser as a light source.

9. The ultra-short throw projector device of claim 1, further comprising a micro-LED as a light source.

10. The ultra-short throw projector device of claim 1, wherein the longer side of the lens system whose light path is changed is 5 cm or less in length.

11. The ultra-short throw projector device of claim 1, wherein the lens system is employed in a voice assistant speaker based on AI.

12. The ultra-short throw projector device of claim 1, wherein the lens system is employed in a smart ordering device.

13. The ultra-short throw projector device of claim 1, wherein the lens system is employed in a transparent signage system.

14. The ultra-short throw projector device of claim 1, wherein the lens system is employed in a smart home controller.

15. The ultra-short throw projector device of claim 1, wherein the lens system is employed in a head mounted display device of an augmented reality display or a virtual reality display, generating an augmented image or a virtual image.

16. The ultra-short throw projector device of claim 1, wherein the lens system is employed in a scanner or a printer, generating a scanning image or a printing image.

17. An ultra-short throw projector device having a lens system, wherein the lens system comprises:
- a first lens group configured to form a first intermediate image from an incident display image;
- a second lens group configured to form a second intermediate image from the first intermediate image, the second lens group being disposed in the back of the first intermediate lens group;
- an aperture configured to be disposed on a point where the first intermediate image is formed between the first lens group and the second lens group;
- a reflection mirror configured to reflect and magnify the second intermediate image and form an image on a screen, the reflection mirror being disposed in the back of the second lens group; and
- a light path changing prism configured to change a light path in the vertical direction or other directions, the prism being disposed at a point on the light path of the lens system,
- wherein the throw ratio of the lens system is 0.05 to 0.3, and the EFL (Effective Focal Length) is 0.1 mm to 0.8 mm.

18. The ultra-short throw projector device of claim 3, wherein the reflection mirror is configured of a plurality of mirrors, each mirror being a convex mirror or a concave mirror.

19. The ultra-short throw projector device of claim 6, wherein the window is configured of a lens, and at least one surface of the window is an aspheric lens.

\* \* \* \* \*